(12) United States Patent
Bolz et al.

(10) Patent No.: US 9,275,491 B2
(45) Date of Patent: Mar. 1, 2016

(54) GPU WORK CREATION AND STATELESS GRAPHICS IN OPENGL

(75) Inventors: Jeffrey A. Bolz, Austin, TX (US); Jesse David Hall, Santa Clara, CA (US); Jerome F. Duluk, Jr., Palo Alto, CA (US); Patrick R. Brown, Wake Forest, NC (US); Gregory Scott Palmer, Cedar Park, TX (US)

(73) Assignee: NVIDIA Corporation, Santa Clara, CA (US)

( * ) Notice: Subject to any disclaimer, the term of this patent is extended or adjusted under 35 U.S.C. 154(b) by 1110 days.

(21) Appl. No.: 13/078,878

(22) Filed: Apr. 1, 2011

(65) Prior Publication Data

US 2011/0242119 A1 Oct. 6, 2011

Related U.S. Application Data

(60) Provisional application No. 61/321,094, filed on Apr. 5, 2010.

(51) Int. Cl.
| | | |
|---|---|---|
| *G06T 15/00* | (2011.01) | |
| *G06T 15/80* | (2011.01) | |
| *G06T 1/60* | (2006.01) | |
| *G06F 9/30* | (2006.01) | |
| *G06F 9/38* | (2006.01) | |
| *G06T 1/00* | (2006.01) | |

(52) U.S. Cl.
CPC ............ *G06T 15/005* (2013.01); *G06F 9/3009* (2013.01); *G06F 9/3851* (2013.01); *G06F 9/3879* (2013.01); *G06F 9/3891* (2013.01); *G06T 1/00* (2013.01); *G06T 1/60* (2013.01); *G06T 15/80* (2013.01)

(58) Field of Classification Search
CPC ......... G06T 1/60; G06T 15/005; G06T 15/80; G06F 9/3851
USPC ......... 345/501, 502, 506, 530, 536, 537, 541, 345/558
See application file for complete search history.

(56) References Cited

U.S. PATENT DOCUMENTS

| | | | |
|---|---|---|---|
| 6,208,361 B1 * | 3/2001 | Gossett | 345/536 |
| 6,525,737 B1 * | 2/2003 | Duluk et al. | 345/506 |
| 6,675,239 B1 * | 1/2004 | Van Hook et al. | 710/55 |
| 7,447,873 B1 * | 11/2008 | Nordquist | 712/22 |
| 7,634,637 B1 * | 12/2009 | Lindholm et al. | 712/22 |
| 7,822,885 B2 * | 10/2010 | Bouvier | 710/22 |
| 2003/0101312 A1 * | 5/2003 | Doan et al. | 710/313 |
| 2003/0107577 A1 * | 6/2003 | Obara et al. | 345/506 |

* cited by examiner

*Primary Examiner* — Joni Richer
(74) *Attorney, Agent, or Firm* — Artegis Law Group, LLP

(57) ABSTRACT

One embodiment of the present invention sets forth a method for generating work to be processed by a graphics pipeline residing within a graphics processor. The method includes the steps of receiving an indication that a first graphics workload is to be submitted to a command queue associated with the graphics processor, allocating a first portion of shader accessible memory for one or more units of state information that are necessary for processing the first graphics workload, populating the first portion of shader accessible memory with the one or more units of state information, and transmitting to the command queue of the graphics processor the one or more units of state information stored within the first portion of shader accessible memory, wherein the first graphics workload is processed within the graphics pipeline based on the one or more units of state information.

25 Claims, 6 Drawing Sheets

GPU WORK CREATION AND STATELESS GRAPHICS IN OPENGL

CROSS-REFERENCE TO RELATED APPLICATIONS

This application claims benefit of U.S. provisional patent application entitled "GPU Work Creation and Stateless Graphics in OPENGL" filed on Apr. 5, 2010 and having a Ser. No. 61/321,094.

BACKGROUND OF THE INVENTION

1. Field of the Invention

The present invention relates generally to generating work for a graphics processing unit (GPU) and, more specifically, to GPU work creation and stateless graphics in OpenGL.

2. Description of the Related Art

In a typical processing environment, and especially in a graphics processing environment, there is a large amount of state information that is transmitted by an application to facilitate the processing of input data in a processing pipeline. The state information is transmitted by the application executing on a central processing unit (CPU) to an external processing unit, such as a graphics processing unit (GPU), via a driver.

Existing graphics application program interfaces (APIs) have an extremely limited capacity for creating work from within the GPU. Some APIs provide a "draw indirect" functionality, where the parameters to a DrawElements or DrawArrays call (primitive type, vertex count, and indices used to address data in a vertex buffer) are taken from a buffer in GPU memory rather than being specified on the CPU. This allows those parameters to be written by the GPU, and then consumed by the GPU without being read back to the CPU. However, such a mechanism still requires that the application code running on the CPU know ahead of time that the work is going to be generated, where the corresponding parameters need to be written, and in what order various work must be executed. In addition, the CPU thread is responsible for setting up the state required to process each GPU-generated draw command as well as submitting the work. Therefore, such a mechanism does not alleviate the dependency on the CPU to create workloads or portions thereof that are to be processed on the GPU.

As the foregoing illustrates, what is needed in the art is a mechanism for effectively generating graphics workloads that are to be processed by the GPU from within the GPU.

SUMMARY OF THE INVENTION

One embodiment of the present invention sets forth a method for generating work to be processed by a graphics pipeline engine residing within a graphics processor. The method includes the steps of receiving an indication that a first graphics workload is to be submitted to a command queue associated with the graphics processor, allocating a first portion of shader accessible memory for one or more units of state information that are necessary for processing the first graphics workload, populating the first portion of shader accessible memory with the one or more units of state information, and transmitting to the command queue of the graphics processor the one or more units of state information stored within the first portion of shader accessible memory, wherein the first graphics workload is processed within the graphics pipeline based on the one or more units of state information.

One advantage of the disclosed method is that graphics workloads can be generated and submitted to the GPU from the shader engine executing within the GPU with minimal intervention of the CPU.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
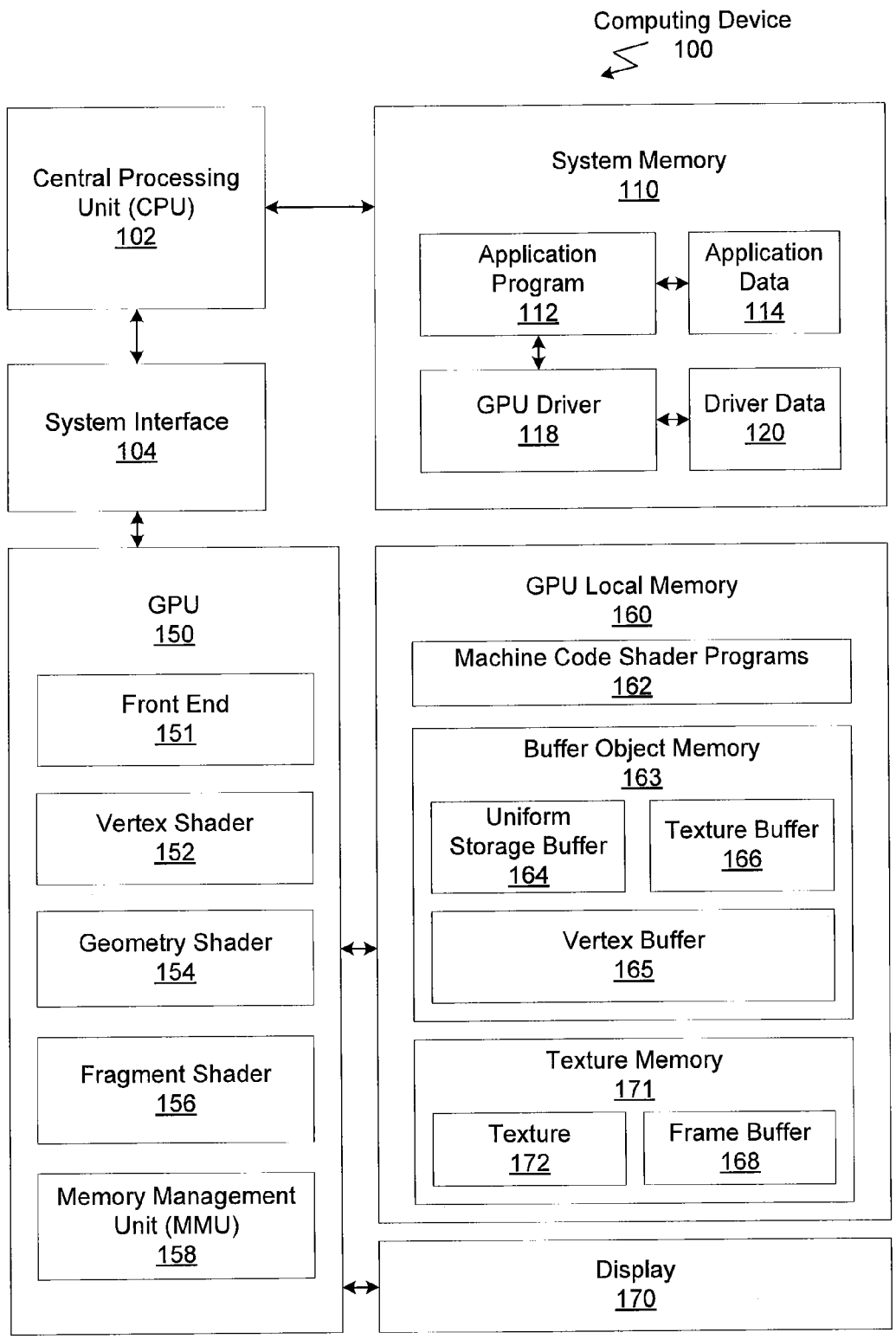
FIG. 1 is a conceptual diagram of a computing device configured to implement one or more aspects of the present invention.

FIG. 1 is a conceptual diagram of a computing device 100 configured to implement one or more aspects of the present invention. The computing device 100 includes a central processing unit (CPU) 102, a system interface 104, a system memory 110, a GPU 150, a GPU local memory 160 and a display 170. The CPU 102 connects to the system memory 110 and the system interface 104. The CPU 102 executes programming instructions stored in the system memory 110, operates on data stored in system memory 110 and communicates with the GPU 150 through the system interface 104, which bridges communication between the CPU 102 and GPU 150. In alternate embodiments, the CPU 102, GPU 150, system interface 104, or any combination thereof, may be integrated into a single processing unit. Further, the functionality of GPU 150 may be included in a chipset of in some other type of special purpose processing unit or co-processor. The system memory 110 stores programming instructions and data for processing by the CPU 102. The system memory 110 typically includes dynamic random access memory (DRAM) configured to either connect directly to the CPU 102 (as shown) or alternately, via the system interface 104. The GPU 150 receives instructions transmitted by the CPU 102 and processes the instructions in order to render graphics data and images stored in the GPU local memory 160. The GPU local memory 160 is any memory space accessible by the GPU 150 including local memory, system memory, on-chip memories, and peer memory. The GPU 150 displays certain graphics images stored in the GPU local memory 160 on the display 170.

The system memory 110 includes an application program 112, application data 114, a GPU driver 118 and GPU driver data 120. The application program 112 generates calls to a graphics API in order to produce a desired set of results, typically in the form of a sequence of graphics images. The application program 112 also transmits one or more high-level shading programs to the graphics API for processing within the GPU driver 118. The high-level shading programs are typically source code text of high-level programming instructions that are designed to operate on one or more shaders within the GPU 150. The graphics API functionality is typically implemented within the GPU driver 118.

The GPU local memory 160 includes a set of machine code shader programs 162, a buffer object memory 163 and a texture memory 171. The machine code shader programs 162 are transmitted from the GPU driver 118 to GPU local memory 160. The machine code shader programs 162 may include, without limitation, the machine code vertex shader program, the machine code geometry shader program, the machine code fragment shader program, or any number of variations of each. The buffer object memory 163 includes a uniform storage buffer 164, a texture buffer 166 and a vertex buffer 165. The uniform storage buffer 164 stores one or more uniform variables, also called "uniforms." A uniform variable is held constant during a given invocation of the associated shader but may be altered between invocations. The texture buffer 166 stores data elements typically organized in one-dimensional arrays.

The texture memory 171 includes texture 172 and frame buffer 168. The texture 172 and the frame buffer 168 include at least one two-dimensional surface that is used to drive the display 170. The texture 172 and the frame buffer 168 may include more than one two-dimensional surfaces so that the GPU 150 can render to one two-dimensional surface while a second two-dimensional surface is used to drive the display 170. Data stored within the texture 172 and the frame buffer 168 is typically accessed with the assistance of application specific hardware that provides for a dimensional access view of the data. For example a two-dimensional surface may be addressed with the assistance of a hardware unit that transposes a horizontal and vertical surface location into a physical memory address that corresponds to the location.

The GPU 150 includes a front end 151, a vertex shader 152, a geometry shader 154 and a fragment shader 156 and a memory management unit (MMU) 158. The front end 151 receives commands defining processing tasks to be executed by the GPU 150 from the GPU driver 118. Processing tasks include indices of data to be processed, e.g., surface (patch) data, primitive data, vertex data, and/or pixel data, as well as state parameters and commands defining how the data is to be processed (e.g., what program is to be executed). As is well-known, the vertex shader 152 receives a sequence of one or more sets of vertex attributes, where each set of vertex attributes is typically associated with one vertex and one or more vertices are associated with a geometric primitive. The vertex shader 152 processes the vertex attributes, performing such operations as evaluating the vertex's position relative to the viewer and evaluating lighting equations to determine each vertex color. The vertex shader 152 may also use data from the buffer object memory 163 in the GPU local memory 160. For example, the vertex shader 152 may use data from the uniform storage buffer 164 or the texture buffer 166. The machine code vertex shader program executes on the vertex shader 152, imparting specific processing behavior according to specific requirements and specifications of the application program 112. The geometry shader 154 receives sets of processed vertices from the vertex shader 152. The geometry shader 154 performs per-primitive operations on vertices grouped into primitives such as triangles, lines, strips and points emitted by the vertex shader 152, enabling functionality such as shadow volume generation and procedural synthesis. The machine code geometry shader program executes on the geometry shader 154, imparting specific processing behavior according to specific requirements and specifications of the application program 112. A fixed-function rasterizer (not shown) that is situated between the geometry shader 154 and the fragment shader 156 scan converts an individual geometric primitive into a set of fragments with interpolated vertex attributes. The fragment shader 156 processes the fragments, each containing fragment data, which may include raster position, depth or interpolated vertex attributes, such as texture coordinates, opacity, and other relevant per-pixel data, to produce final pixel values. The final pixel values are stored in the frame buffer 168 by a fixed-function raster operations unit (not shown) that also performs operations such as depth and stencil tests as well as any blending of the final pixel values with values currently stored in the frame buffer. The machine code fragment shader program executes on the fragment shader 156, resulting in specific processing behavior according to specific requirements and specifications of the application program 112.

The MMU 158 is configured to map virtual addresses into physical addresses. The MMU 158 includes a set of page table entries (PTEs) used to map a virtual address to a physical address of a page, and optionally includes a cache. The MMU 158 may include address translation lookaside buffers (TLB) or caches which may reside within the GPU 150. The physical address is processed to distribute surface data access locality to allow efficient request interleaving among partition units. The cache may be used to determine whether of not a request for a cache line is a hit or miss, improving the performance of the MMU.

The display 170 is an output device capable of emitting a visual image corresponding to an input data signal. For example, the display may be built using a cathode ray tube (CRT) monitor, a liquid crystal display, or any other suitable display system. The input data signal to the display 170 is typically generated by scanning out the contents of one or more frames of image data that is stored in the frame buffer 168.

Figure 2:
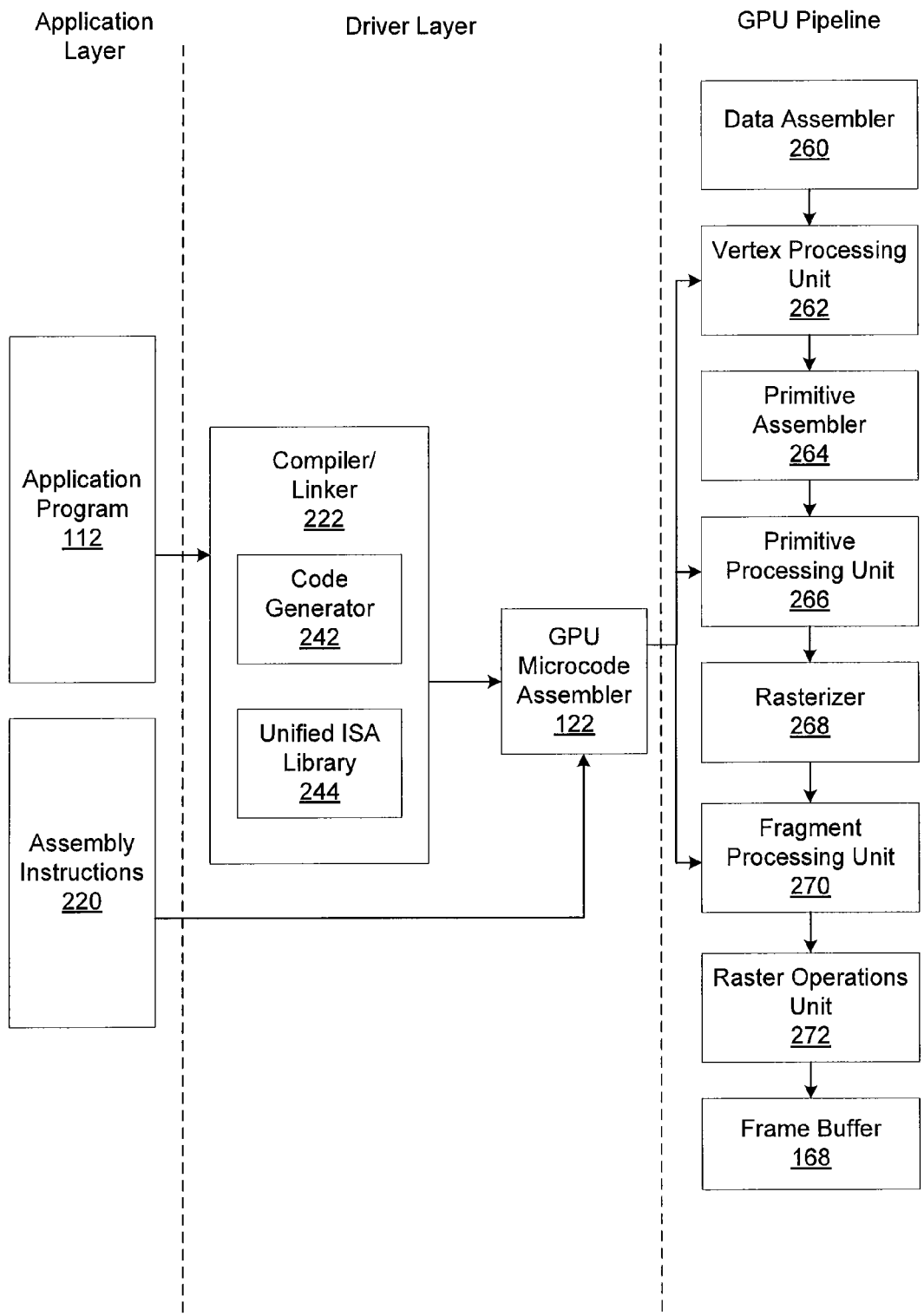
FIG. 2 is a conceptual diagram of a shader programming model, according to one embodiment of the present invention.

FIG. 2 is a conceptual diagram of a shader programming model 200, according to one embodiment of the present invention. As shown, the shader programming model 200 includes the application program 112, which transmits high-level shader programs to the GPU driver 118. The GPU driver 118 then generates machine code programs that are used within the GPU 150 to specify shader behavior within the different processing domains of the GPU 150.

The high-level shader programs transmitted by the application program 112 may include a high-level vertex shader program, a high-level geometry shader program and a high-level fragment shader program. Each of the high-level shader programs is transmitted through an API to the compiler/linker 222 within the GPU driver 118. The compiler/linker 222 compiles the high-level shader programs 114 into assembly language program objects.

Under shader programming model 200, domain-specific shader programs, such as high-level vertex shader program, high-level geometry shader program, and high-level fragment shader program, are compiled using a common instruction set target, supported by unified instruction set architecture (ISA) library 244. With the common instruction set, application developers can compile high-level shader programs in different domains using a core set of instructions having the same syntax and consequently should expect faster compile times for such shader programs. One example of this common ISA is supported by the Unified Instruction Set Architecture ("ISA") developed by NVIDIA Corporation, Santa Clara, U.S.A.

Compiler/linker 222, which includes code generator 242 and unified ISA library 244, provides cross-domain linking capabilities. Specifically, compiler/linker 222 translates the high-level shader programs designated for different domains (e.g., the high-level vertex shader program, the high-level geometry shader program, and the high-level fragment shader program), which are written in high-level shading language, into distinct compiled software objects in the form of assembly code. Further, instead of sending these compiled objects of assembly code individually to separate GPU microcode assemblers (not shown), compiler/linker 222 also "links" the compiled assembly code to generate a single compiled/linked program object, also in the form of either assembly code or machine code. To link multiple compiled objects from different domains (also referred to as to "rendezvous"), compiler/linker 222 needs to reconcile the use of symbols across the domains. Specifically, there are generally two types of symbols, the first type being defined or exported symbols, and the second type being undefined or imported symbols. The first type of symbols broadly refers to functions or variables that are present in one compiled object (e.g., vertex shader assembly code) and should be made available for use by other compiled objects (e.g., geometry shader assembly code and/or fragment shader assembly code). The second type of symbols broadly refers to functions or variables that are called or referenced by one compiled object (e.g., vertex shader assembly code) but are not internally defined within this compiled object.

Additionally, compiler/linker 222 supports two types of linking, linking by name and linking by semantics. To illustrate linking by name, suppose Color is the name of a variable containing color values to be passed from the vertex shader program to the fragment shader program. Suppose also that Color is defined in this vertex shader program. In programming model 200, compiler/linker 222 facilitates the establishment and maintenance of the input/output relationship between high-level vertex shader program 220 and, for example, high-level geometry shader program 222 without requiring any explicit variables-to-hardware mappings in the shader programs, so long as the two shader programs use the name Color consistently. To link by semantics, on the other hand, the variable names are not required to be the same. While the OpenGL Shading Language (GLSL) generally does not link by semantics, an exception within GLSL is where built-in names have semantic association. For example, gl_Position refers to the position of a vertex, gl_Color refers to the color of a fragment and gl_TexCoord[0] refers to the first of a set of texture coordinates for a vertex or fragment. A second use of linking by semantics occurs with the use of BindFragDataLocationNV( ) described in greater detail herein. Suppose high-level vertex shader program 220 uses a variable with the name of Vertex_Color for storing the color type X to be passed to high-level geometry shader program 220, and high-level geometry shader program 222 uses a variable with the name of Geometry Color for receiving the color type X. In this scenario, compiler/linker 222 is still capable of establishing and maintaining the input/output relationship between high-level vertex shader program 220 and high-level geometry shader program 222, so long as Vertex Color and Geometry Color are assigned the same semantics corresponding to the color type X.

The program objects are transmitted to the GPU microcode assembler 122, which generates machine code programs, including a machine code vertex shader program, a machine code geometry shader program and a machine code fragment shader program. The machine code vertex shader program is transmitted to a vertex processing unit 262 for execution. Similarly, the machine code geometry shader program is transmitted to a primitive processing unit 266 for execution and the machine code fragment shader program is transmitted to a fragment processing unit 270 for execution.

Shader programs can also be transmitted by the application program 112 via assembly instructions 220. The assembly instructions 220 are transmitted directly to the GPU microcode assembler 122 which then generates machine code programs, including a machine code vertex shader program, a machine code geometry shader program and a machine code fragment shader program, as previously described herein.

A data assembler 260 and the vertex processing unit 262 function as the vertex shader 152 of FIG. 1. The data assembler 260 is a fixed-function unit that collects vertex data for high-order surfaces, primitives, and the like, and outputs the vertex data to vertex processing unit 262. The data assembler 260 may gather data from buffers stored within system memory 110 and GPU local memory 160 as well as from API calls from the application program 112 used to specify vertex attributes. The vertex processing unit 262 is a programmable execution unit that is configured to execute a machine code vertex shader program, transforming vertex data as specified by the vertex shader programs. For example, vertex processing unit 262 may be programmed to transform the vertex data from an object-based coordinate representation (object space) to an alternatively based coordinate system such as world space or normalized device coordinates (NDC) space. The vertex processing unit 262 may read vertex attribute data directly from the GPU local memory 160 via the buffer load mechanism described below. The vertex processing unit 262 may read texture map data as well as uniform data that is stored in GPU local memory 160 through an interface (not shown) for use in processing the vertex data. The vertex shader 152 represents the vertex processing domain of the GPU 150.

A primitive assembler 264 and the primitive processing unit 266 function as the geometry shader 154. A second primitive assembler (not shown) may be included subsequent to the primitive processing unit 266 in the data flow through the GPU 150. The primitive assembler 264 is fixed-function unit that receives processed vertex data from vertex processing unit 262 and constructs graphics primitives, e.g., points, lines, triangles, or the like, for processing by primitive processing unit 266. In prior art systems, the primitive processing unit performs well-known, fixed-function viewport operations such as clipping, projection and related transformations on the incoming vertex data. In the GPU 150, the primitive processing unit 266 is a programmable execution unit that is configured to execute machine code geometry shader program to process graphics primitives received from the primitive assembler 264 as specified by the geometry shader program. For example, in addition to well-known viewport operations, the primitive processing unit 266 may be programmed to subdivide the graphics primitives into one or more new graphics primitives and calculate parameters, such as plane equation coefficients, that are used to rasterize the new graphics primitives. The primitive processing unit 266 may read data directly from the GPU local memory 160 via the buffer load mechanism described below. Additionally, the primitive processing unit 266 may read texture map data that is stored in GPU local memory 160 through an interface (not shown) for use in processing the geometry data. The geometry shader 154 represents the geometry processing domain of the GPU 150. The primitive processing unit 266 outputs the parameters and new graphics primitives to a rasterizer 268. The rasterizer 268 is a fixed-function unit that scan converts the new graphics primitives and outputs fragments and coverage data to the fragment processing unit 270.

The fragment processing unit 270 performs the functions of the fragment shader 156 of FIG. 1. The fragment processing unit 270 is a programmable execution unit that is configured to execute machine code fragment shader programs to transform fragments received from rasterizer 268 as specified by the machine code fragment shader program 128. For example, the fragment processing unit 270 may be programmed to perform operations such as perspective correction, texture mapping, shading, blending, and the like, to produce shaded fragments that are output to a raster operations unit 272. The primitive processing unit 266 may read data directly from the GPU local memory 160 via the buffer load mechanism described below. Additionally, the fragment processing unit 270 may read texture map data as well as uniform data that is stored in local memory 160 through an interface (not shown) for use in processing the fragment data. The raster operations unit 272 optionally performs fixed-function computations such as near and far plane clipping and raster operations, such as stencil, z test and the like, and outputs pixel data as processed graphics data for storage in a buffer in the GPU local memory 160, such as the frame buffer 168.

GPU Work Creation with Stateless Graphics

Stateless graphics refers to a new programming model for the GPU 150, where all graphics workloads to be processed by the GPU 150 are self-contained, i.e., include all the state information that is needed to process the graphics workloads. For example, each draw call could include all the state needed for the draw call. In such a model, the state information needed to process a graphics workload does not need to be tracked by GPU driver 118. This allows the generation and execution of the different graphics workloads to be more independently ordered and parallelizable. It also allows workloads to be generated from within the GPU 150 and interleaved with workloads generated by the CPU 102.

Figure 3:
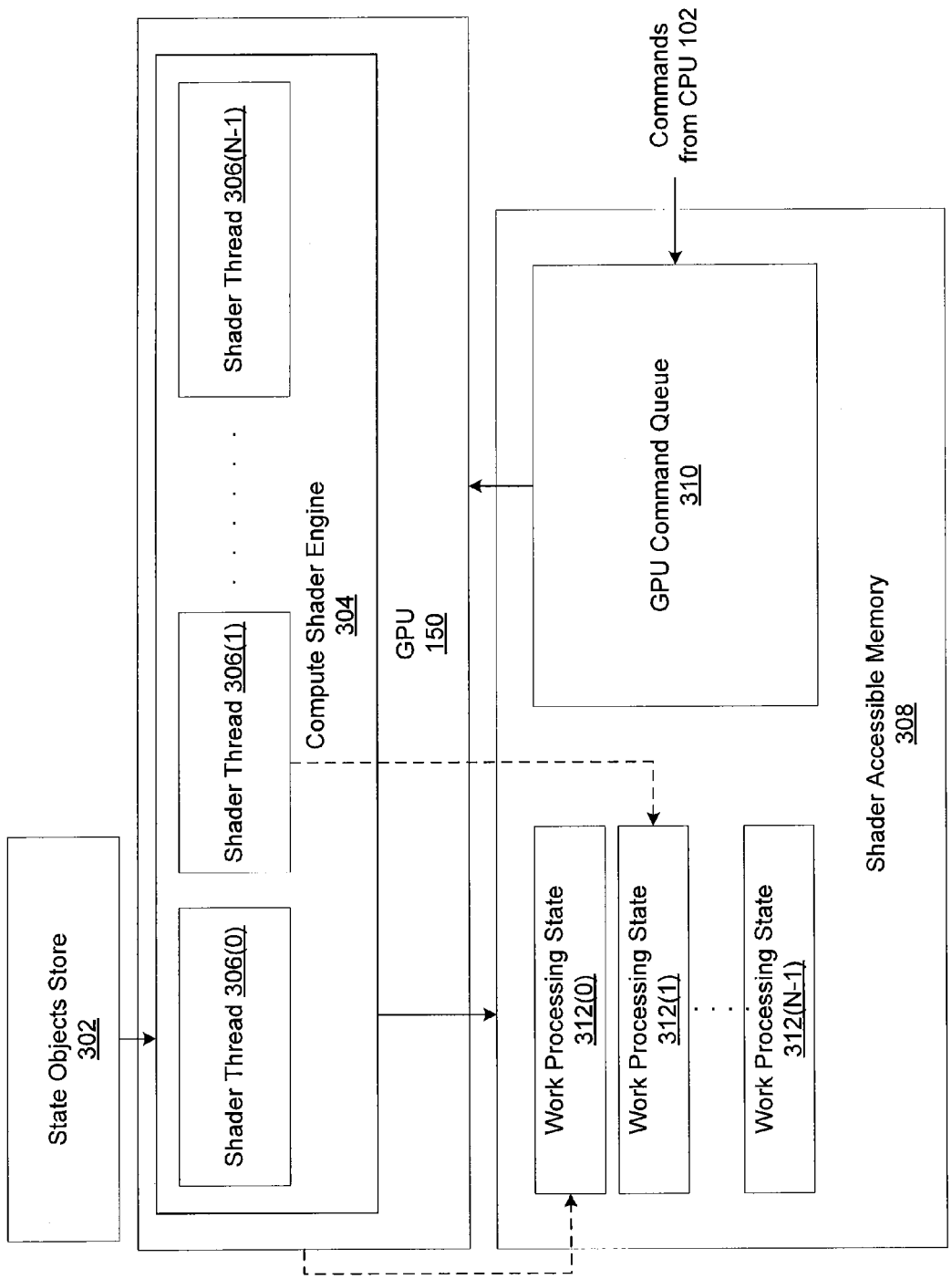
FIG. 3 is a block diagram of a compute shader engine within the GPU that is configured to generate graphics work, according to one embodiment of the invention.

FIG. 3 is a block diagram of a compute shader engine 304 within the GPU 150 that is configured to generate graphics workloads, according to one embodiment of the invention. As shown, the compute shader engine 304 is coupled to state objects store 302 and shader accessible memory 308.

The state objects store 302 includes one or more pre-compiled state objects generated by the CPU 102. Each state object includes state information that configures one or more portions of the graphics pipeline of the GPU 150 according to particular graphics workload or a group of graphics workloads to be processed by the GPU 150. In addition, in one embodiment, each state object is associated with a handle that specifies the address of the state object as well as the size of the state object.

A state object may specify static state information and/or dynamic state information. In one embodiment, static state is included within the state object itself and dynamic state specified by the state object is set separately outside the state object. Static state typically does not vary with a high frequency between different graphics workloads that are to be processed by the graphics pipeline. A static state parameter also, in general, has a smaller set of possible values and may have complex interactions with other state properties. Therefore, validation operations need to be performed by the GPU driver 118 on static state properties prior to transmitting that state information to the graphics pipeline of the GPU 150. Dynamic state typically vary with a comparatively higher frequency between different graphics workloads. Also, in general, a dynamic state parameter has a comparatively larger set of possible values and is less likely to have complex interactions with other state properties. In one embodiment, the division of state into static state and dynamic state may be configured according to the needs of the application program 112. Typically, we would recommend that applications limit to dynamic state to only that state which they change frequently. The actual set of state that would want to change frequently would vary from application to application.

The compute shader engine 304 invokes a plurality of shader threads 306. Each shader thread 306 executes a different instance of a compute shader configured to generate graphics workloads for execution within the GPU 150. In operation, the application program 112, via the GPU driver 118, configures each shader thread 306 to generate a graphics workload and submit corresponding state information so that the graphics workload can be processed by the GPU 150.

To generate a graphics workload, a shader thread 306 first allocates a portion of memory within the shader accessible memory 308 (referred to herein as "shader state 312") for storing state information corresponding to the graphics workload being generated. Different units of state information included in the work processing state 312 include the contents of or a reference to a pre-compiled state object from the state object store 302, values of dynamic state parameters, values of environment parameters, and values of different parameters of the graphics command specifying the graphics workload to be processed by the GPU 150. An environment parameter is not specific to a particular graphics command and is typically intended to set top-level state information that can be used by the various shaders of the graphics pipeline of the GPU 150. Examples of environment parameters include a GPU address for a scene graph structure that stores vertex buffer GPU addresses and texture bindings, or constants used to select between various code paths of a shader program, etc.

The size of the portion of memory allocated to work processing state 312 by a given shader thread 306 is specified by the application program 112 and is determined based on the size of the different units of state information needed to process the graphics workload. In operation, the application program 112 can query, via the GPU driver 118, the size of the different units of state information that will be stored in work processing state 312. For example, the application program 112 can query the size, in bytes, that a particular pre-compiled state object will consume in the work processing state 312, the size, in bytes, that the maximum sized state object will consume in the work processing state 312, and the sizes that different environment parameters and parameters of the graphics command will consume in the work processing state 312.

Once the portion of memory is allocated to work processing state 312, the shader thread 306 populates the work processing state 312 via built-in functions in the compute shading language. One function, when executed, copies the contents of or a reference to a pre-compiled state object specified by the application program 112 into the work processing state 312 via a handle to the state object provided by the application program 112. Another function populates the work processing state 312 with values of environment parameters, and a different function populates the work processing state 312 with values of parameters of the graphics command specifying the graphics workload to be processed by the GPU 150.

Finally, the shader thread 306 submits the graphics workload specified by the work processing state 312 to the GPU command queue 310 within the shader accessible memory 308. The GPU command queue 310, in turn, transmits the graphics workload to the GPU 150 for processing. Graphics workloads included in the GPU command queue 310 are executed by graphics pipeline of the GPU 150 in the order in which the workloads are submitted. Therefore, since each shader thread 306 submits different graphics workloads to the GPU command queue 310, the order in which the graphics work is processed by the GPU 150 is determined based on the order in which the graphics workload was received. If the order does not matter, such as for simple depth-tested geometry where the depth function accomplishes the ordering, then each shader thread 306 can submit the graphics workload as soon as the corresponding work processing state 312 is populated. If, however, the order does matter, such as for transparent blended geometry, then a shader thread 306 submits the graphics workload in the order the graphics work should be executed. Since work submission is separate from work generation, the serial operations are limited to the submission step rather than including the generation step. This also allows the shader thread 306 an opportunity to sort different graphics work loads before the work is submitted for increased performance, such as by sorting objects from front to back for increased early depth test efficiency.

In addition, as shown in FIG. 3, commands are transmitted to the GPU command queue 310 from the CPU 102 as well. GPU-generated work, i.e. graphics workloads submitted by the shader threads 306, is inserted in the command stream of the GPU command queue 310 to execute in order before any graphics work received from the CPU 102 that was submitted after the commands that provoked the GPU-generated work were executed. For example, if the following command sequence were generated by the application program 102:

(a) Draw1( );
(b) Draw2( );
(c) Compute Launch1( ); //generates Draw3+Draw4
(d) Draw5( );
(e) Draw6( );

then the draw calls would be executed in order 1-6. More specifically, because command (c) that generates the draw calls 3 and 4 from within a shader thread 306 is executed before commands (d) and (e), draw calls 3-4 are executed before draw calls 5-6. The CPU 102 should not be stalled waiting for the draw calls 3-4 to finish before commands (d) and (e) can be submitted.

In one embodiment, graphics workloads generated by the shader threads 306 can inherit state information set by the CPU 102 for previously executed graphics work. Using the example command sequence above, draw calls 3 and 4 may inherit state from the graphics context set by the CPU 102 at the time command (c) was executed.

In another embodiment, the graphics workloads generated by the shader threads 306 can access memory objects within the GPU local memory, such as vertex buffer 165 and texture 172, via bindless memory access.

In yet another embodiment, the application program 102 may configure the shader engine 304 such that there is an upper bound on the size and number of graphics workloads that will be generated by each shader thread 306. Such a mechanism relieves the shader engine 304 of the complexity of managing memory and/or command buffers.

Figure 4:
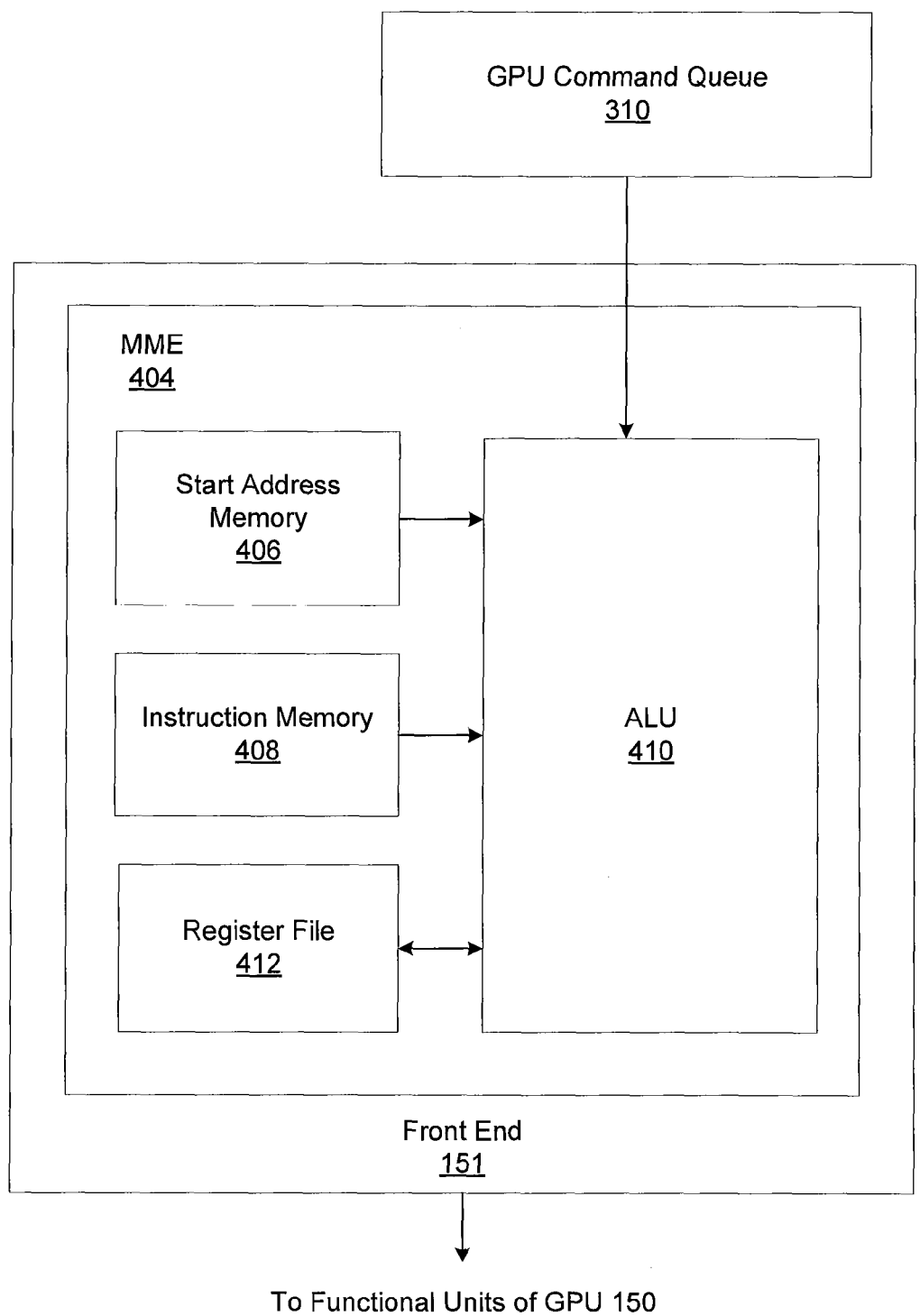
FIG. 4 is a block diagram of a method macro expander (MME) within the FE of FIG. 1, according to one embodiment of the present invention.

FIG. 4 is a block diagram of a method macro expander (MME) 404 within the front end 151 of FIG. 1, according to one embodiment of the present invention. As shown, the GPU command queue 310 is coupled to the front end 151, and the MME 404 includes a start address memory 406, an instruction memory 408 and arithmetic logic unit (ALU) 410 and a register file 412.

Packets of work (referred to herein as "methods") received by the GPU command queue 310 are typically organized as having a header portion and a fixed-size data portion. The header portion indicates the type of operation and/or information about the data portion such as the size and/or the type. The MME 404 is a programmable processor that is configured to perform method expansion in order to reduce the bandwidth required to deliver state information as well as other packets of work to the GPU 150. In operation, a packet of work is transmitted to the MME 404, via the GPU command queue 310, in a compressed format. The MME 404 expands the single packet of work to different packets of work via a set of instructions stored in an instruction memory 408 internal to the MME 404. The different packets of work are then transmitted for execution to the functional units of the GPU 150, such as the vertex shader 152, for further processing.

The instruction memory 408 in the MME 404 stores one or more macros received by the GPU driver 118. Each macro includes a sequence of instructions that, when executed on a packet of work received from the GPU driver 118 or the GPU command queue 310, performs a particular expansion operation. In one embodiment, a macro is implemented using a simple instruction set with a basic 32-bit datapath. The instruction set may include instructions to Add, Subtract, Field Extract and Shift, Bitwise Logical Operations, and Branch. A multiple-instruction sequence can be used to perform 64-bit math for operations such as calculating 64-bit virtual addresses. The instructions include the ability to read input parameters passed to the macro from the GPU command queue 310. To maximize performance, the first input parameter may be made immediately available to the first instruction of the macro so that the first input may be processed without incurring a one-cycle read delay.

In one embodiment, packets of work that represent a state object storing state information transmitted to the MME 404 are unpacked according to macros stored within the MME instruction memory 408. To indicate to the unpacking macro which properties within the state object are marked as dynamic, one packet of work includes a bit field, where each bit in the bit field indicates whether a corresponding property is marked as dynamic. For each of the static properties, the MME 404, via the state unpacking macro, unpacks the state object and generates packets of work for the graphics pipeline of the GPU 150 to set the corresponding state in the downstream units. In addition, since the dynamic properties can vary significantly, the MME 404 can be configured with a macro that is able to interpret the dynamic properties without the intervention of CPU 102.

In one embodiment, in the case of a graphics workload generated by a shader thread 306, the pre-compiled state objects specified by the shader thread 306 for a particular graphics workload include static state as well as dynamic MME macros indicating how the different dynamic state (not included in the state object) is to be interpreted. When the MME 404 processes the state object specified by the shader thread 306, the dynamic MME macros are loaded and executed such that any dynamic state specified by the shader thread 306 can be consumed.

In one embodiment, previously used state objects are tracked by the MME 404. In such an embodiment, the MME 404, within the ALU 410, determines whether the state object specified by a current workload is the same as a previously used state object. If so, then the MME 404 may perform filtering operations such that the state object need not be fetched from the state object store 302.

In another embodiment, the MME 404 is configured to track current values of various pieces of graphics pipeline state. When the new state values included in the state object are unpacked by the MME 404, one or more commands to modify the state of the graphics pipeline are prepared for transmission to downstream units. For each current value of graphics pipeline state being tracked, the MME 404 compares the new state value with the currently tracked state value and discards any commands where the current graphics pipeline state would remain unchanged. Such a mechanism reduces the number of commands to be processed by the remainder of the graphics pipeline when switching between two very similar state objects.

Figure 5:
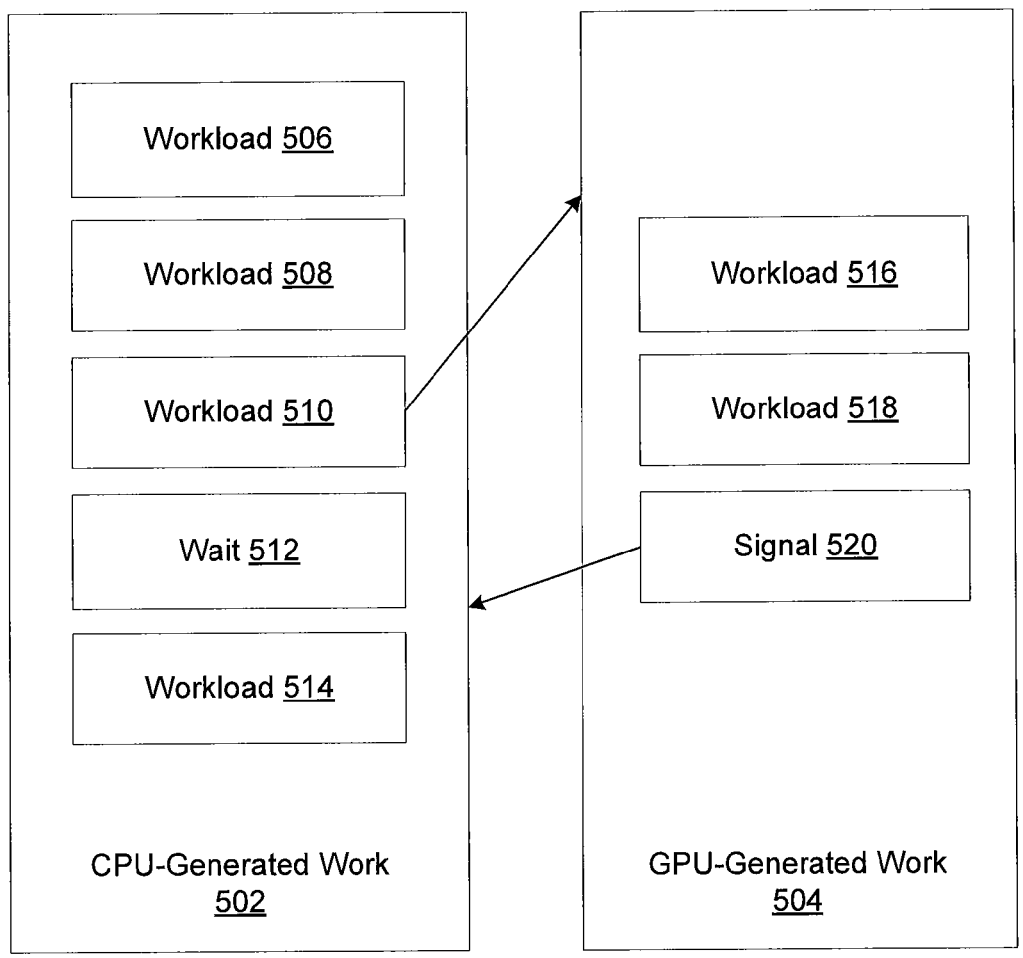
FIG. 5 is a conceptual diagram of a synchronization operation performed on CPU-generated work and GPU-generated work, according to one embodiment of the present invention.

FIG. 5 is a conceptual diagram of a synchronization operation performed on CPU-generated work 502 and GPU-generated work 504, according to one embodiment of the invention. As shown, the CPU-generated work 502 includes workload 506, workload 508, workload 510 and workload 514. In addition, the GPU-generated work 504 includes workload 516 and workload 518 that are generated by workload 510 after the CPU-generated work 502 has been processed by the CPU 102.

As previously described herein, the workloads generated by the CPU 102 and the GPU 150 need to be processed in order. To implement such an ordering, a synchronization operation between the CPU-generated work 502 and the GPU-generated work 504 may be put in place. Therefore, to ensure that the different workloads of the CPU-generated work 502 and GPU-generated work 504 are properly ordered, after the workload 510 is processed, the CPU 102 inserts a wait 512 ahead of workload 514. Once a shader thread 306 has completed the generation and submission of workload 516 and workload 518, the shader thread 306 inserts signal 520 indicating that the next workloads in the CPU-generated work 502 may be executed. When the GPU 150 executes the two sets of workloads, the wait 512 instructs the GPU 150 to yield from CPU-generated work 502 to GPU-generated work 504, and the signal 520 indicates that it can switch back to CPU-generated work 502.

Figure 6:
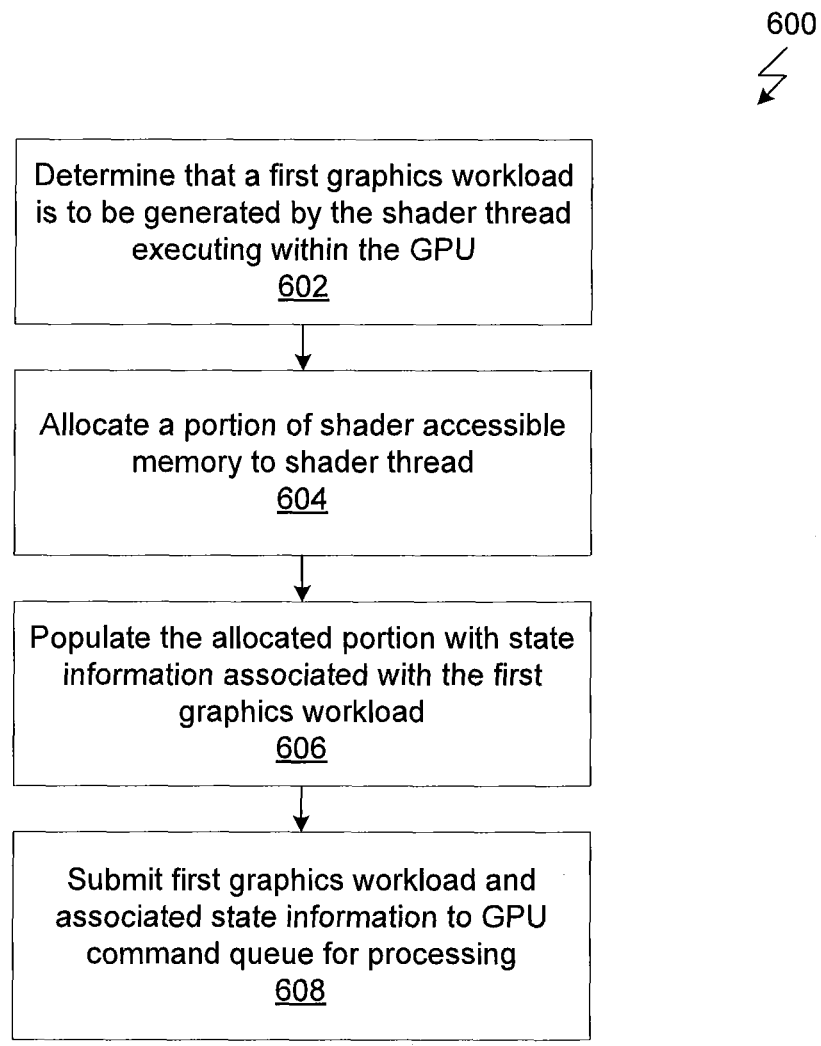
FIG. 6 is a flow diagram of method steps for generating work from within a shading engine, according to one embodiment of the present invention.

FIG. 6 is a flow diagram of method steps for generating work from within a shading engine, according to one embodiment of the present invention. Although the method steps are described in conjunction with the system for FIGS. 1-3, persons skilled in the art will understand that any system configured to perform the method steps, in any order, is within the scope of the invention.

The method 600 begins at step 602, where, based on an indication received from the application program 112, a shader thread 306 determines that a first graphics workload is to be generated. At step 604, the shader thread 306 allocates a portion of shader accessible memory 308 for storing work processing state 312.

At step 606, the shader thread 306 populates the work processing state 312 associated with the first graphics workload within the portion of shader accessible memory 308 allocated at step 604. The shader thread 306 populates the work processing state 312 via built-in functions in the compute shading language. One function, when executed, copies a pre-compiled state object specified by the application program 112 into the work processing state 312 via a handle to the state object provided by the application program 112. Another function populates the work processing state 312 with values of environment parameters, and a different function populates the work processing state 312 with values of parameters of the graphics command specifying the graphics workload to be processed by the GPU 150.

At step 608, the shader thread 306 submits the first graphics workload specified by work processing state 312 to the GPU command queue 310. The GPU command queue 310, in turn, transmits the first graphics workload to the GPU 150 for processing.

Advantageously, the techniques disclosed herein allow for generating and submitting workloads from the shader engine executing within the GPU with minimal intervention of the CPU.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Another embodiment of the invention may be implemented as a program product deployed for use over a network. In such an embodiment, the program product may be accessed via a web browser.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

We claim:

1. A computer-implemented method for generating work to be processed by a graphics pipeline residing within a graphics processor, the method comprising:
  receiving an indication that a first graphics workload is to be submitted to a command queue associated with the graphics processor;
  allocating, via a first shader thread, a first portion of shader accessible memory for one or more units of state information that are related to processing the first graphics workload;
  populating, via the first shader thread, the first portion of memory with the one or more units of state information;
  sorting the first graphics workload and a second graphics workload in an order of execution based on the one or more units of state information and on state information related to processing the second graphics workload; and
  transmitting to the command queue of the graphics processor the one or more units of state information stored within the first portion of memory and the state information related to processing the second graphics workload, wherein the first graphics workload and the second graphics workload are processed within the graphics pipeline in the order of execution.

2. The method of claim 1, further comprising receiving a handle to a first pre-compiled state object that includes at least one unit of state information associated with the first graphics workload.

3. The method of claim 2, wherein the size of the first portion of the memory is based on the size of the first pre-compiled state object.

4. The method of claim 2, wherein populating the first portion of memory comprises copying the first pre-compiled state object to the first portion of memory via the handle to the first pre-compiled state object.

5. The method of claim 2, wherein populating the first portion of memory includes computing and storing the values of dynamic state associated with the first pre-compiled state object.

6. The method of claim 2, wherein the at least one unit of state information associated with the first graphics workload is compressed, and the at least one unit of state information is decompressed before the first graphics workload is processed by the graphics processor.

7. The method of claim 1, further comprising transmitting to the command queue a second command and state information associated with the second command received from an application program executing on a second processor.

8. The method of claim 7, wherein the second command is transmitted to the command queue after the first graphics workload has been transmitted to the command queue, and the second command is not processed until the graphics processor processes the first graphics workload.

9. The method of claim 7, wherein the state information associated with the second command is inherited for processing the first graphics workload.

10. The method of claim 1, wherein a plurality of threads that includes the first shader thread executes within a shader engine, and each of the threads performs the steps of receiving, allocating and populating in parallel with one another.

11. The method of claim 10, wherein the threads further perform the step of transmitting in parallel with one another.

12. The method of claim 10, wherein the threads further perform the step of transmitting serially to one another.

13. The method of claim 1, wherein the first graphics workload is self-contained and does not depend on state information corresponding to a second graphics workload.

14. The method of claim 1, wherein at least one unit of state information related to processing the first graphics workload can be accessed from the memory via bindless memory access.

15. The method of claim 1, wherein a first unit of state information stored within the first portion of memory was previously transmitted to the graphics processor, and further comprising filtering the one or more units of state information such that the first unit of state information is not transmitted to the graphics processor.

16. The method of claim 1, wherein sorting the first graphics workload and the second graphics workload in the order of execution comprises selecting the order in which the first graphics workload and the second graphics workload are processed by the graphics pipeline.

17. The method of claim 1, wherein the one or more units of state information that are related to processing the first graphics workload include at least one of a reference to a pre-compiled state object associated with the first graphics workload, values of dynamic state parameters associated with the first graphics workload, values of environment parameters associated with the first graphics workload, and values of different parameters of the indication.

18. A non-transitory computer-readable storage medium storing instructions that, when executed by a processor, cause the processor to execute a plurality of threads that includes a first shader thread and to generate work to be processed by a graphics pipeline residing within a graphics processor, by performing the steps of:
  receiving an indication that a first graphics workload is to be submitted to a command queue associated with the graphics processor;
  allocating, via the first shader thread, a first portion of shader accessible memory for one or more units of state information that are related to processing the first graphics workload;
  populating, via the first shader thread, the first portion of memory with the one or more units of state information;
  sorting the first graphics workload and a second graphics workload in an order of execution based on the one or more units of state information and on state information related to processing the second graphics workload; and
  transmitting to the command queue of the graphics processor the one or more units of state information stored within the first portion of memory and the state information related to processing the second graphics workload, wherein the first graphics workload and the second graphics workload are processed within the graphics pipeline in the order of execution.

19. The computer-readable medium of claim 18, further comprising transmitting to the command queue a second command and state information associated with the second command received from an application program executing on a second processor.

20. The computer-readable medium of claim 19, wherein the second command is transmitted to the command queue after the first graphics workload has been transmitted to the command queue, and the second command is not processed until the graphics processor processes the first graphics workload.

21. The computer-readable medium of claim 19, wherein the state information associated with the second command is inherited for processing the first graphics workload.

22. The computer-readable medium of claim 18, wherein a plurality of threads that includes the first shader thread executes within a shader engine, and each of the threads performs the steps of receiving, allocating and populating in parallel with one another.

23. The computer-readable medium of claim 18, wherein the first graphics workload is self-contained and does not depend on state information corresponding to a second graphics workload.

24. The computer-readable medium of claim 18, wherein at least one unit of state information related to processing the first graphics workload can be accessed from the memory via bindless memory access.

25. The computer-readable medium of claim 18, wherein a first unit of state information stored within the first portion of memory was previously transmitted to the graphics processor, and further comprising filtering the one or more units of state information such that the first unit of state information is not transmitted to the graphics processor.

* * * * *